United States Patent [19]

Teare et al.

[11] Patent Number: 5,207,095

[45] Date of Patent: May 4, 1993

[54] VEHICLE BRAKING TECHNIQUE EVALUATION APPARATUS

[75] Inventors: Peter R. Teare, Westborough; William J. Hanson, Bolton, both of Mass.

[73] Assignee: Liberty Mutual Insurance Company, Boston, Mass.

[21] Appl. No.: 775,715

[22] Filed: Oct. 11, 1991

[51] Int. Cl.⁵ .......................................... G01M 19/00
[52] U.S. Cl. ................................. 73/121; 346/33 TP
[58] Field of Search ............. 73/129, 121; 346/33 TP; 303/DIG. 1; 364/558

[56] References Cited

U.S. PATENT DOCUMENTS

| | | | |
|---|---|---|---|
| 3,853,004 | 12/1974 | Westlake et al. | 73/151.5 |
| 4,100,792 | 7/1978 | Leiber | 73/121 X |
| 4,520,663 | 6/1985 | Moore et al. | 73/129 |

Primary Examiner—Jerry W. Myracle
Attorney, Agent, or Firm—Wolf, Greenfield & Sacks

[57] ABSTRACT

A pneumatic or hydraulic pressure sensor is connected in parallel with the vehicle braking system and the sensor is connected to a computer system which periodically samples the sensor output. Other sensors can be used to detect other quantities such as engine speed, vehicle speed, wheel rotation or transmission speed, and other brake units and their outputs can also be periodically sampled. Under control of the computer, the samples are stored on a magnetic disk. The computer can then be instructed to interrogate the samples stored on the disk to produce charts of various quantities versus time which objectively indicate driver performance. The device can also be used to synchronize individual brake units in a multiple brake vehicle by simultaneously displaying the brake pressures in each brake unit, thereby enabling the relative application timing of the brake units to be measured.

11 Claims, 3 Drawing Sheets

VEHICLE BRAKING TECHNIQUE EVALUATION APPARATUS

FIELD OF THE INVENTION

This invention relates to vehicle driver training apparatus and, in particular, to apparatus which tests a driver's vehicle braking techniques.

BACKGROUND OF THE INVENTION

It is well known that the driving abilities, techniques and habits of vehicle operators vary considerably from person to person. Driving techniques used by the same person may also vary considerably depending on road and weather conditions.

Although driving abilities may be related to such factors as age, experience, physical condition and other factors which are difficult to change, there is a large body of statistical evidence gathered by insurance companies and public safety authorities which clearly indicates that certain driving techniques or habits are far safer than other habits.

For example, the manner in which a vehicle operator applies the vehicle brakes obviously affects vehicle stopping distance and, in many cases, driving safety. The manner in which the brakes are applied varies considerably, even with the same driver, depending on road conditions, required stopping distance, vehicle weights and loading and other factors.

One critical factor in accident avoidance is brake application in rapid stop or "panic" situations. In this type of situation many drivers tend to over apply the brakes, resulting in locking of the vehicle wheels and skidding. It is well-known that traction between the vehicle tire and the road is greatly reduced when the tire is skidding from the traction which is available when the wheel is rotating. When the traction is reduced the driver tends to apply the brakes even harder resulting in more wheels locking and even further reduced traction. This situation is further exacerbated by adverse road conditions such as wet or icy pavement. These road conditions increase the likelihood that the vehicle wheels will experience different traction and therefore the likelihood that one or more wheels will lock. In addition, they also increase the likelihood of loss in directional control which also results from wheel skid.

In an effort to overcome this problem, "anti lock" braking systems have been developed. These systems utilize a central computer system with rotation sensors at each wheel. When a wheel begins to lock and initiate a skid, the computer senses the reduction in wheel rotation frequency and momentarily releases the brake on that wheel. Thus, maximum braking efficiency is maintained, but the wheels are not allowed to lock. The anti-lock braking system is very effective in preventing wheel skid in rapid stop situations. However, it has only recently become available in most vehicles. In addition, it is costly and generally requires disk type brakes on all vehicle wheels. Consequently, the anti lock braking system cannot be easily retrofitted into existing vehicles which are not already equipped for such operation.

Accordingly, in the interest of safety, a considerable effort has been made to effectively train vehicle operators to use "safe" driving habits and techniques. One of these techniques is called brake "stabbing" or "pumping" in which the vehicle operator repeatedly applies and releases the vehicle brakes. This technique either prevents the wheels from locking or minimizes the time during which the wheels are locked, thereby avoiding skidding problems. When used properly, the technique is highly effective especially with large, heavy vehicles, such as tractor-trailer rigs, in adverse road condition situations.

However, the brake stabbing technique is not entirely straightforward as its effectiveness is largely dependent upon the exact brake pressure and timing used by the operator during the technique. Generally, it is difficult for the driver to tell which wheels, if any, have locked and the length of time during which the wheels have locked and, therefore, it is difficult for an operator to evaluate his own performance in braking technique.

Consequently, the technique takes some training and practice for fully effective use. However, there are no prior art methods for testing or quantifying an operator's skill in using the technique. Frequently, driver evaluation has been measured by having a driving instructor or trainer ride with the driver in a test vehicle while the driver drives the test vehicle over a specially designed test track. The trainer can then evaluate the driver's technique during actual performance. Alternatively, a practice driving session can be photographed or videotaped for later evaluation. These indirect methods only quantify overall vehicle performance and do not directly measure the driver's techniques and skills.

Accordingly, it is an object of the present invention to provide a sensing device which can directly measure an operator's driving performance.

It is another object of the present invention to provide a sensing device which can quantitatively measure an operator's driving performance.

It is still another object of the present invention to provide a sensing device which can quantitatively measure an operator's braking technique.

It is yet another object of the present invention to provide a sensing device which can easily be connected to the braking system of many conventional vehicles.

It is a further object of the present invention to provide a sensing device which is relatively simple to use.

SUMMARY OF THE INVENTION

The foregoing problems are solved and the foregoing objects are achieved in one illustrative embodiment of the invention in which a pneumatic or hydraulic pressure sensor is connected in parallel with the vehicle braking system. The sensor is connected to a computer system which periodically samples the sensor output. Other sensors can be used to detect other quantities such as engine speed vehicle speed and wheel rotation or transmission speed and their outputs can also be periodically sampled. Under control of the computer, the samples are stored on a magnetic disk. The computer can then be instructed to interrogate the samples stored on the disk to produce charts of various quantities versus time which objectively indicate driver performance.

The illustrative system can also be used to monitor individual brakes in a multi brake system, such as a tractor-trailer vehicle. In such a vehicle, separate brakes are used for each set of wheels, and the individual brakes must be synchronized in order for the vehicle to stop properly. By collecting data on each individual brake set, the inventive apparatus can simultaneously display the individual brake pressures as a function of time. Using this display, it is possible to directly monitor brake synchronization.

DETAILED DESCRIPTION OF THE PREFERRED EMBODIMENT

Figure 1:
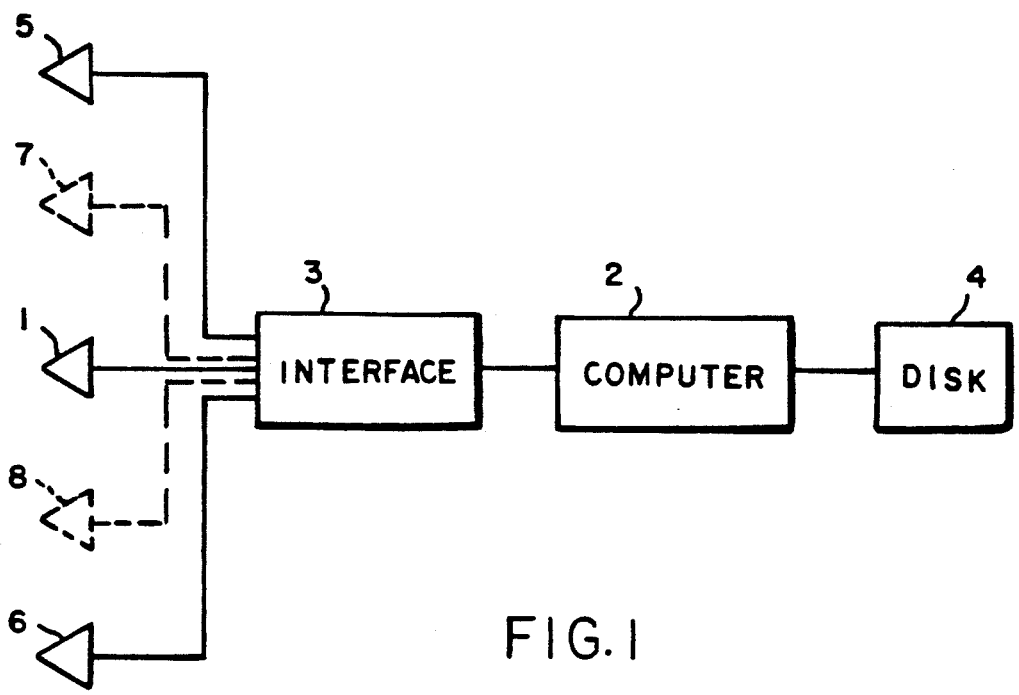
FIG. 1 is a block schematic diagram of the performance evaluation system.

The inventive system comprises hardware and software to measure, evaluate, and report driving performance related to a number of useful driving parameters, but especially to brake application. The basic system is shown in FIG. 1 and comprises a brake pressure sensor 1, a computer 2 (which, illustratively may be a laptop computer), signal interface 3, and software.

Brake pressure sensor 1 may vary in construction depending on the vehicle being used in the testing procedure. For example, most tractor-trailer vehicles use pneumatic brakes and, accordingly, a pressure sensor designed for these vehicles must sense air pressure. Alternatively, most automobiles use a hydraulic braking system and the pressure sensor must sense hydraulic fluid pressure. In either case, such sensors are of conventional and well known construction. In such a construction, the sensor converts the sensed quantity into a varying electrical resistance. The electrical resistance appears across a pair of output terminals and generally varies proportionally with the sensed pressure.

It is also possible to use additional sensors, such as sensors 5 and 6, to measure engine rpm and wheel or transmission rotation to supplement the brake pressure data. These sensors ar also of conventional design.

If the inventive system is to be used to monitor brake synchronization in a multiple brake vehicle, then additional brake sensors 7 and 8 may also be provided. Sensors 7 and 8 are shown in dotted lines because they are optional additions to the basic system. The sensors would be constructed in a manner equivalent to sensor 1.

The outputs of sensors 1, 5 and 6 (and sensors 7 and 8, if used) are forwarded to signal interface 3. Interface 3 detects the outputs of the sensors in a conventional manner. For example, if sensor 1 varies a resistance in response to brake pressure changes, the resistance of sensor 1 can be monitored by passing a current through the sensor to convert the sensor output into a voltage signal. Depending on the output of sensors 5 and 6, interface 3 may also convert these outputs into a voltage signal. Interface 3 may also include an analog-to-digital converter in order to convert the sensor signal voltage to a digital word which can be sampled by computer 2. If more than one sensor is provided, each digital word comprising the output from a sensor can be preceded by a coded "flag" indicating the sensor which originated the data word, or, alternatively, data words from each sensor can be assembled in a predetermined order to form a longer data word. Alternatively, a multiple channel data acquisition unit can be used with each sensor assigned to a separate "channel". Such units are commercially available and comprise an internal sample and hold circuit and analog-to-digital converter. The converted analog signal is clocked and placed on the computer's data bus (not shown) by means of clocking circuitry (not shown) found in the data acquisition unit. A data acquisition unit suitable for use with the present invention is a model DT2814 A/D converter board manufactured by Data Translation, Inc., 100 Locke Drive, Marlboro, Mass. 01752.

Computer 2 may illustratively be a portable "laptop" computer utilizing a self-contained power supply or operating from 12-volt DC power available from the vehicle cigarette lighter socket. The sensor data words generated by interface 3 are placed on the computer's data bus by interface 3. Computer 2 is controlled by a simple software program to periodically sample the incoming data words and store the result in the attached disk drive 4 which may illustratively be a floppy disk drive.

Figure 2:
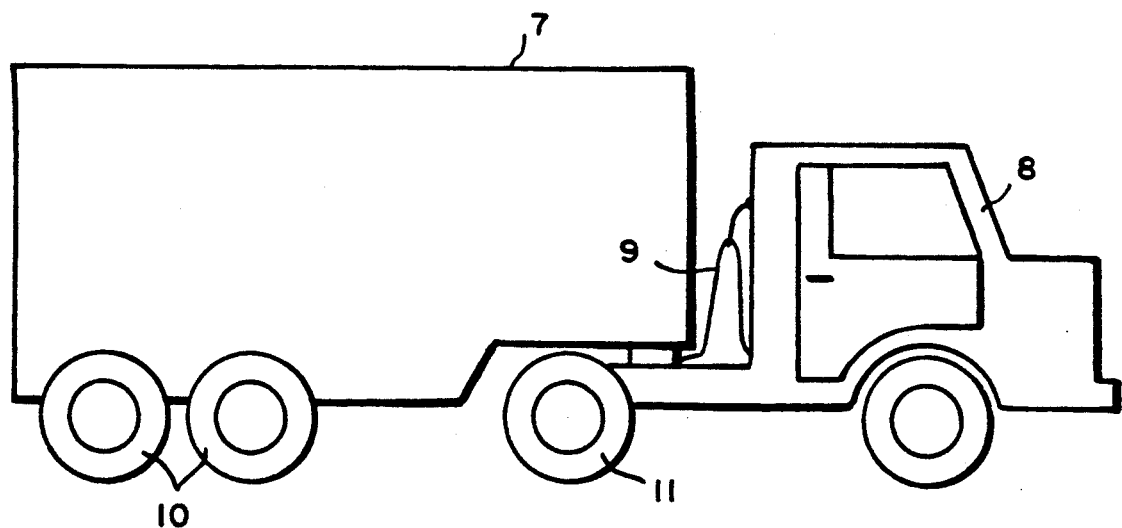
FIG. 2 is a schematic diagram of a tractor-trailer vehicle with a pneumatic or hydraulic sensor connected into a vehicle braking system.
Figure 3:
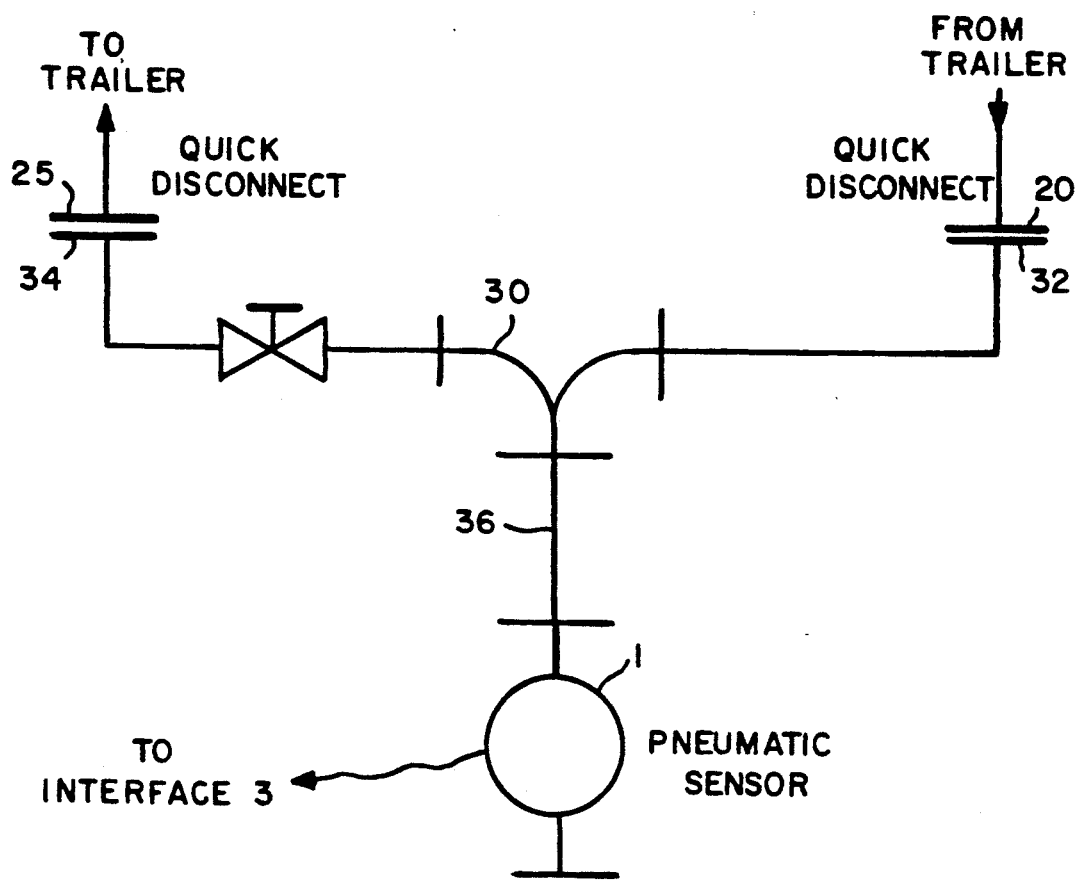
FIG. 3 is an illustrative diagram of the sensor connected into pneumatic air lines via a conventional quick-disconnect coupling system.

FIGS. 2 and 3 illustrate the attachment of a brake pressure sensor in a conventional tractor-trailer vehicle braking system. The vehicle consists of a trailer portion 7 and a tractor portion 8. Trailer 7 and tractor 8 are conventionally connected together by means of pneumatic brake lines 9. Lines 9 connect the trailer braking system to the tractor braking system so that the pneumatic brakes on the back wheels 10 of trailer 7 are controlled by the tractor braking system. In order to allow easy separation of trailer 7 and tractor 8, pneumatic lines 9, which are permanently connected to the trailer braking system, are connected to the tractor by means of quick-disconnect pneumatic fittings, known as "glad hands" fittings which are shown in more detail as fittings 20 and 25 in FIG. 3. During normal vehicle operation, fittings 20 and 25 are connected together. In order to insert the pressure transducer, it is attached to a special in-line adapter 30. Adapter 30 has a pair of quick-disconnect couplings 32 and 34 which mate with the existing couplings on the vehicle. The existing fittings 20 and 25 are separated and connected to fittings 32 and 34, respectively, as shown in FIG. 3 so that adapter 30 is connected in series with the pneumatic brake line. The pressure transducer 1 is connected to a tap 36 on adapter 30 so that it is effectively connected in parallel with the trailer braking system. Since pneumatic pressures vary from vehicle to vehicle, pressure transducer 1 must be calibrated to the air pressure of each particular vehicle in order to allow the system to accurately track brake pressure applications. This calibration can be done in a conventional manner or separate transducers can be provided for different pressure ranges.

If the inventive system is to be used to synchronize a multiple brake system, then additional sensors (such as sensors 7 and 8 in FIG. 1) must also be connected to the vehicle braking system. For example, in the tractor-trailer unit shown in FIG. 2, sensors would be connected, in addition, to the brake units for rear wheels 10 and the brake unit for tractor wheels 11. Because timing is critical in brake synchronization, the sensors would normally be mounted near each brake unit and connected directly to the brake line near its entrance into the individual brake wheel cylinder.

In order to use the system, a driving instructor installs the pressure transducer in the vehicle braking system. In the case of a tractor-trailer unit, this is done by removing the pneumatic brake lines at the quick-disconnect fitting at the tractor and snapping the adapter into the tractor fitting. The trailer lines are then inserted into the adapter to connect the transducer in parallel with the trailer braking system as previously discussed. Computer 2 is then turned on and a data diskette is inserted into drive 4. This data diskette will be used to store performance statistics for each driver for later review. The sampling program is then started and the driver begins to maneuver the vehicle through a test course, applying the brakes as necessary to stop the vehicle. Preferably, this course will include portions which will require the driver to perform an emergency stop by pumping or stabbing the brakes. The course may also include an emergency stop section in which the roadway is flooded or wet to simulate a potential skidding situation.

Figure 4:
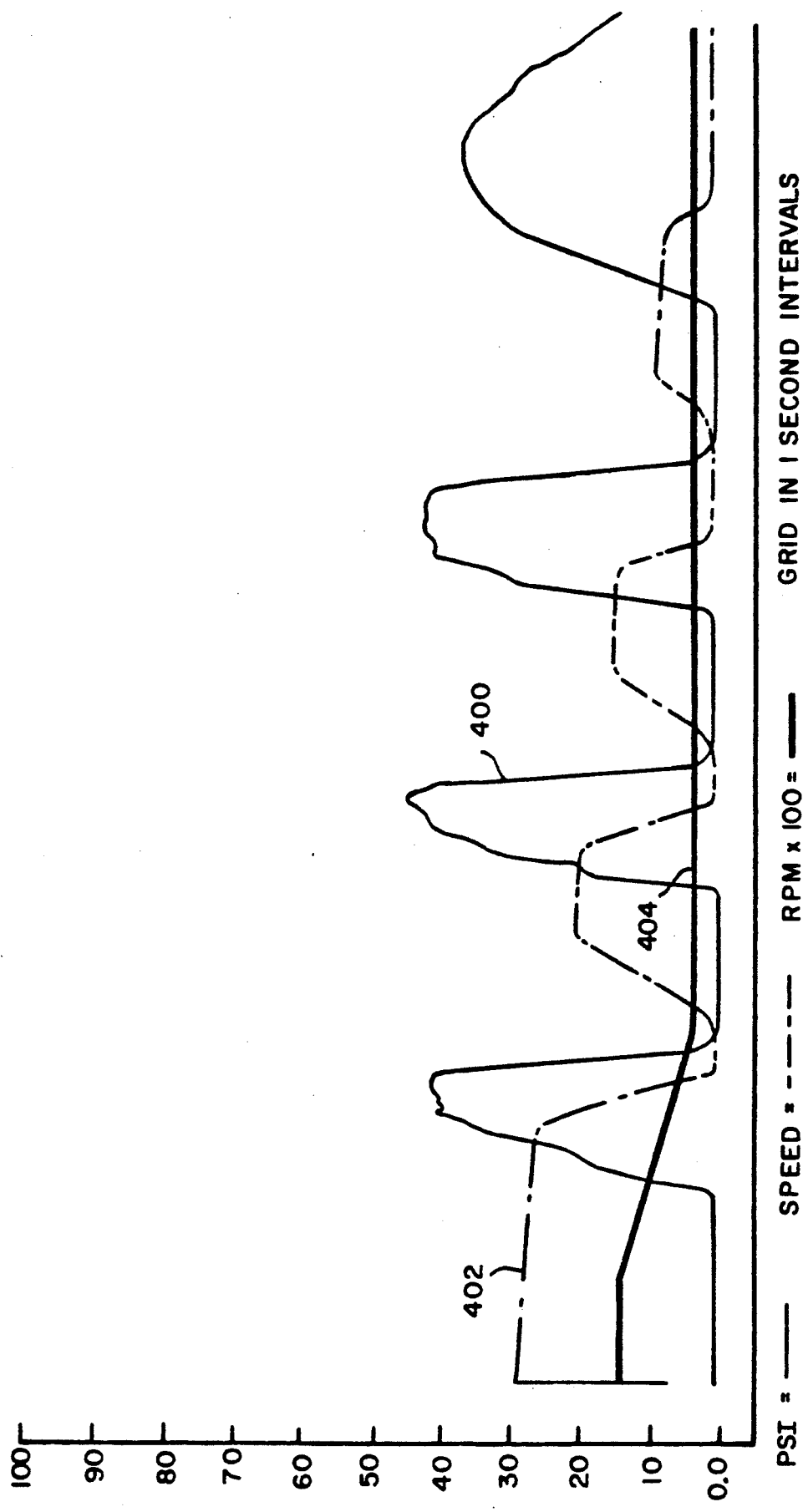
FIG. 4 shows an illustrative graph produced by the inventive evaluation system.

During the test driving run, the system periodically samples brake pressure and, depending on the number of sensors, engine rpm and wheel speed. The samples are stored on the floppy disk inserted into disk drive 4. After the test drive has been completed the data stored on the disk can be printed out on a printer (not shown) by means of a simple program to generate a performance plot as shown in FIG. 4. The performance plot is typically a graph displaying brake pressure (on the ordinate) as a function of time (along the abscissa), but the graphical presentation can be varied to suit the needs of the particular application.

In a preferred form of the graph as shown in FIG. 4, vehicle brake pressure is displayed over a 15 to 30 second time period. In particular, FIG. 4 illustrates various quantities displayed with a one second time periods along the abscissa. Of course, other time periods could also be used. The vertical scale is relative from zero to one hundred. In accordance with the invention, at least the brake pressure is displayed (in FIG. 4, the brake pressure is shown as trace 400. In cases where engine rpm and speed are also sampled and stored, these data points are overlayed on the brake pressure plot to create a complete record of driving performance. Engine RPM and speed are displayed as traces 404 and 402, respectively, in FIG. 4.

The data and graphical presentation allow an instructor to directly view the relationship between various driver and vehicle parameters. For example, the frequency, amplitude, and duration of brake applications can be reviewed to see if these applications were appropriate for the speed, load, vehicle, and road conditions. The simultaneous acquisition and display of vehicle speed and engine rpm allows one to determine which gear the vehicle was in, when the clutch was disengaged, when the wheels locked, and the relationship of these factors to brake application.

Based on this information, a trained instructor can then suggest alternate techniques which allow a driver to attain the optimum performance by minimizing the "controlled" stopping distance.

If the system is used for brake synchronization then, instead of the engine RPM 404 and speed 402 the brake pressures from the additional brake sensors can be displayed as overlays with pressure trace 400. The displayed time difference in the pressure peaks can then be measured directly from the graph and used to time and synchronize individual brake applications in accordance with vehicle specifications in a well known manner.

What is claimed is:

1. Apparatus for measuring and quantifying a driver's performance as a vehicle is being driven over a road, to be used in training a vehicle driver in proper braking techniques, the vehicle having a pressurized fluid braking system and a brake controllable by the vehicle driver for applying a pressure to said fluid for slowing and stopping the vehicle at appropriate locations in the road in response to predetermined road conditions, said driver training apparatus comprising:

means responsive to said pressure for generating a signal representing a magnitude of said pressure;

means for converting said signal into a plurality of digital words, each of said plurality of digital words representing the magnitude of said pressure at a point in time;

means responsive to said digital words for temporarily storing a group of said words representing magnitude values of said pressure over a predetermined interval of time; and means responsive to said stored digital words for printing a graphical representation of said pressure over the predetermined period of time.

2. Vehicle braking technique evaluation apparatus according to claim 1 wherein said signal generating means comprises a pressure transducer.

3. Vehicle braking technique evaluation apparatus according to claim 1 wherein said converting means comprises a analog-to-digital converter for converting said signal into a plurality of digital words and means for sampling said digital words.

4. Vehicle braking technique evaluation apparatus according to claim 1 wherein said storing means comprises a disk drive having a disk therein on which digital information can be stored and a computer for controlling said disk drive to store said digital words on said disk drive.

5. Vehicle braking technique evaluation apparatus according to claim 1 wherein said printing means comprises a printer.

6. Vehicle braking technique evaluation apparatus for measuring driver performance as a vehicle is being driven through a test course, the vehicle having a pressurized fluid braking system and means for applying a pressure to said fluid for slowing and stopping the vehicle at appropriate locations in the course, said evaluation apparatus comprising:

a pressure transducer connected in parallel with said vehicle braking system and responsive to said pressure for generating a signal representing a magnitude of said pressure;

a analog-to-digital converter responsive to said signal for generating a plurality of digital words, each of said plurality of digital words representing the magnitude of said pressure at a point in time;

a magnetic disk storage responsive to said digital words for temporarily storing said words;

a computer for coordinating and controlling the transfer of words from said analog-to-digital converter to said disk storage; and means responsive to said stored digital words for printing a graphical representation of said pressure over a predetermined period of time.

7. Vehicle braking technique evaluation apparatus according to claim 6 wherein said pressure transducer comprises a pneumatic pressure transducer.

8. Vehicle braking technique evaluation apparatus according to claim 6 wherein said pressure transducer comprises a hydraulic pressure transducer.

9. Vehicle braking technique evaluation apparatus according to claim 6 further comprising an adapter for connection in series with brake lines in said vehicle and means for connecting said pressure transducer to said adapter.

10. Vehicle braking technique evaluation apparatus according to claim 9 wherein said adapter has quick-disconnect fitting for connecting said adapter in series with said brake lines.

11. Apparatus for measuring brake synchronization in a multiple brake vehicle, the vehicle having a pressurized fluid braking system and means for applying a pressure to said fluid for actuating each of a plurality of individual brake units, said brake synchronization apparatus comprising:

- means connected to said pressurized fluid braking system near said applying means for generating a first signal representing a magnitude of said pressure at said applying means;
- means connected to said pressurized fluid braking system for generating a second plurality of signals, each of said second plurality of signals representing a magnitude of said pressure at one of said plurality of individual brake units;
- means for converting said first signal into a first plurality of digital words, said first plurality of digital words representing the magnitude of said pressure at said applying means at different points in time over a predetermined period of time;
- means for converting each of said second plurality of signals into a second plurality of digital words, said second plurality of digital words representing the magnitude of said pressure at each of said plurality of individual brake units at different points in time over said predetermined period of time
- means responsive to said first plurality of digital words and said second plurality of digital words for temporarily storing said first plurality of digital words and said second plurality of digital words; and
- means responsive to said stored digital words for printing a graphical representation of said pressure over a predetermined period of time, said graphical representation including separate traces representing the pressure at said applying means and at each of said plurality of individual brake units as a function of time.

* * * * *